(12) United States Patent
Mulcaire

(10) Patent No.: US 8,449,248 B2
(45) Date of Patent: May 28, 2013

(54) CASING ARRANGEMENT

(75) Inventor: Thomas G Mulcaire, Derby (GB)

(73) Assignee: Rolls-Royce PLC, London (GB)

( * ) Notice: Subject to any disclaimer, the term of this patent is extended or adjusted under 35 U.S.C. 154(b) by 757 days.

(21) Appl. No.: 12/715,870

(22) Filed: Mar. 2, 2010

(65) Prior Publication Data

US 2010/0254810 A1 Oct. 7, 2010

(30) Foreign Application Priority Data

Mar. 24, 2009 (GB) .................................. 0904970.1

(51) Int. Cl.
*F01D 25/26* (2006.01)
(52) U.S. Cl.
USPC ........................................ 415/126; 415/213.1
(58) Field of Classification Search
USPC .................. 415/108, 126, 127, 128, 142, 220
See application file for complete search history.

(56) References Cited

U.S. PATENT DOCUMENTS

| 4,502,276 | A | * | 3/1985 | Pask ............................. 415/128 |
| 4,716,721 | A | * | 1/1988 | Pask et al. .................. 415/213.1 |

FOREIGN PATENT DOCUMENTS

| EP | 1 247 944 A2 | 10/2002 |
| GB | 2 011 553 A | 7/1979 |
| GB | 2 114 661 A | 8/1983 |
| GB | 2 168 755 A | 6/1986 |

OTHER PUBLICATIONS

Jul. 8, 2009 Search Report issued in British Patent Application No. GB0904970.1.

* cited by examiner

*Primary Examiner* — Richard Edgar
(74) *Attorney, Agent, or Firm* — Oliff & Berridge, PLC

(57) ABSTRACT

Asymmetric loading within such machines as gas turbine engines can cause distortion of a casing surrounding a rotating assembly. Such distortion may cause rub and therefore inefficient energy usage and shorter operational life. By providing driver arms 112, 212, 312 which extend from radially extending links 113, 213 in a first or high pressure compressor inner casing 101, 201 to a second outer casing 108, compensation for asymmetric loading can be achieved. The casings 101, 201, 108, 208 are presented upon relatively stable bearing supports 102, 110 and therefore, reaction loads are compensated for in order to retain concentricity of the casing 101, 201.

17 Claims, 5 Drawing Sheets

CASING ARRANGEMENT

The present invention relates to casing arrangements and more particularly to casing arrangements utilised in gas turbine engines.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above, it will be appreciated that gas turbine engines are subject to significant reaction forces. The high pressure rotor is suspended between two bearings, one of which is located in front of the high pressure compressor and the other at the rear of the HP turbine. The combustion casing is bolted to the structure which contains the front and rear bearings for the HP rotor. FIG. 2A provides a schematic illustration of the forces (R,T) acting on a gas turbine engine as a result of reacting the generated thrust through the engine. The results of such generated thrust are to create a carcass bend as illustrated below with regard to FIGS. 2A and 2B whereby the rear bearing support structure is pulled upward, relative to the front bearing support structure typically associated with a high pressure compressor stage. The result of such reaction forces presents asymmetric loading as the thrust T cannot be reacted along the engine centerline 31 and is instead reacted at an offset d (FIG. 2A) and is particularly presented upon a combustion outer casing 34 (COC) (FIG. 2B) resulting in casing distortion. This distortion can be communicated to the HPC casing. The rotor spool remains straight and constrained between the front (30) and rear bearings (33).

It is evident that the centrelines of the COC and the HP spool are not concentric as a result of the carcass bend such as shown in FIG. 2B. Thus mounting the HPC casing from the COC can result in displacement radially of the casing relative to the HP spool. In addition, ovalisation of the COC under bending can induce an out-of-round shape in the HPC casing. The results of these effects on the HPC casings are local heavier rubs of the blade and casing and increased local clearances. This impairs the efficiency of the compressor and also has a deleterious effect on the operational stability of the compressor at key flight points such as take-off and can lead to engine surge occurring. Ideally, the HPC casings and HP spool should be maintained concentric and the casing roundness maintained throughout the flight cycle.

FIG. 2, as illustrated above, shows three further examples of high pressure compressor casings and their mountings. These options are prior art means of mounting HPC casings within combustion casings.

As illustrated in FIG. 2C showing a front inter-casing presented upon a first bearing support structure 40 in an engine arrangement 41. The front bearing support structure remains essentially round. In order to avoid asymmetric loading causing problems, a high pressure compressor casing 42 is cantilevered from the casing 40 and presented upon front bearing support structures such that the casing 42 remains essentially round. It will be noted that the combustion outer casing (COC) 43 again is deflected and therefore intermediate portions will have an oval shape but the high pressure compressor casing 42 will remain essentially round.

A further alternative to avoid distortion of the high pressure compressor casing is illustrated in FIG. 2D. The HPC can be mounted by provision of a bolted structure between the COC and the HP casing. The front of the HPC casing is free to slide within the front bearing support structure, thereby allowing the HPC casing to pivot and maintain an improved degree of concentricity to the HP spool than the cantilevered design. A further alternative, is depicted in FIG. 2E. This concept introduces a combustion support casing (CSC) 62 which is bolted to the HPC casing and which engages with the COC at the rear through a sliding connection 64 e.g. cross keys in an engine arrangement 61. The front of the HPC casing engages in a sliding connection 63 with the front bearing support structure. The thrust of the HPC casings can be reacted on the front bearing support structure or through a sliding interface onto the COC. The torque of the HPC system is removed at the cross keyed connection at the CSC rear. Thus the rear of the CSC is mounted in close proximity to the rear bearing of the HP spool, which ensures that the CSC and HP spool are approximately concentric. The sliding connection to the COC also significantly reduces the transmission of asymmetry from the COC to the HPC casings, thus keeping the casing round and thereby minimizing the asymmetric rubbing of the blade tips into the casing with a high pressure compressor casing 62 engaged on bearings 63, 64 in an engine arrangement 61.

Although the above approaches can be configured with reasonable success in service, each concept retains some deficiencies. Whilst the approach employing cantilevered casings as depicted in FIG. 2C will result in the HP casing remaining substantially round, the concept is susceptible to a divergence of the casing and HP spool centrelines under the influence of carcass bending thereby resulting in asymmetric rubbing of the blade tips and HP compressor casings.

The single casing approach as depicted in FIG. 2D can provide an improved degree of concentricity relative to the cantilevered casing depicted in FIG. 2B, however the bolted mounting structure will transmit the asymmetric shape of the COC directly through to the HPC casings, thereby inducing asymmetric rubbing and clearances between the HPC blades and casing.

The double casing approach depicted in FIG. 2E provides the optimum level of concentricity, however the COC has to be larger in diameter than for the previously described concepts and a new component (CSC) added, which results in increased cost and weight of the assembly. In addition, high pressure bleed air has to be ducted from the outlet of the HP casing without mixing with the lower pressure bleed air which is ducted through the annular gap between the CSC and the COC. A duct has to be provided therefore which is bolted to the CSC and passes through the COC. This duct results in a nett radial force acting radially on the CSC which is transmitted through to the HP casing, and hence induces asymmetric rubbing of the HP compressor blades and casing.

The above problems can occur in a number of situations in addition to those associated with gas turbines where there is asymmetric loading between casings typically presented upon respective bearing support structures.

In accordance with aspects of the present invention, there is provided a casing arrangement for a gas turbine engine, the arrangement comprising an inner casing presented upon a first bearing support and an outer casing presented upon a second bearing support concentric about a common centre line or axis, the inner casing having a radially extending link, a driver arm extending from the radially extending link, the driver arm associated with the second bearing support through the outer casing to provide a reaction path to bending of the second bearing support relative to the first bearing support, the reaction path extending at least partially in the direction of the common centre line.

Typically the inner casing comprises a high pressure compressor casing within a gas turbine engine.

Typically the outer casing comprises a combustion outer casing (COC) of a gas turbine engine.

Generally there are at least two radially extending links.

Normally the two radially extending links are presented respectively at substantially 3 o'clock and 9 o'clock in a plane extending perpendicularly to the common axis.

Possibly the inner casing has a slide mounting.

Typically the slide mounting is provided by inter-engaging splines associated with part of the inner casing.

Generally the association between the radially extending link and the driver arm is non-rotating.

Typically the driver arm is associated with the outer casing by a rotating mounting.

Normally the non-rotating mounting comprises an upstanding bolt extending from the outer casing.

Possibly the inner casing is surrounded by a containment casing.

Typically the containment casing is the outer casing.

Possibly the radially extending links extend through an aperture in the containment casing.

Normally the aperture has a seal element.

Possibly a bracing ring is provided at a junction of the driver arm and the radially extending link.

Possibly a spring loaded thrust plate is provided at the junction of the driver arm and the radially extending link.

Possibly the inner casing and the outer casing respectively present dog elements between them, the dog elements arranged to react against each other upon bending of the arrangement about the common axis.

Embodiments of aspects of the present invention will now be described by way of example and with reference to the accompanying drawings in which.

Figure 1:
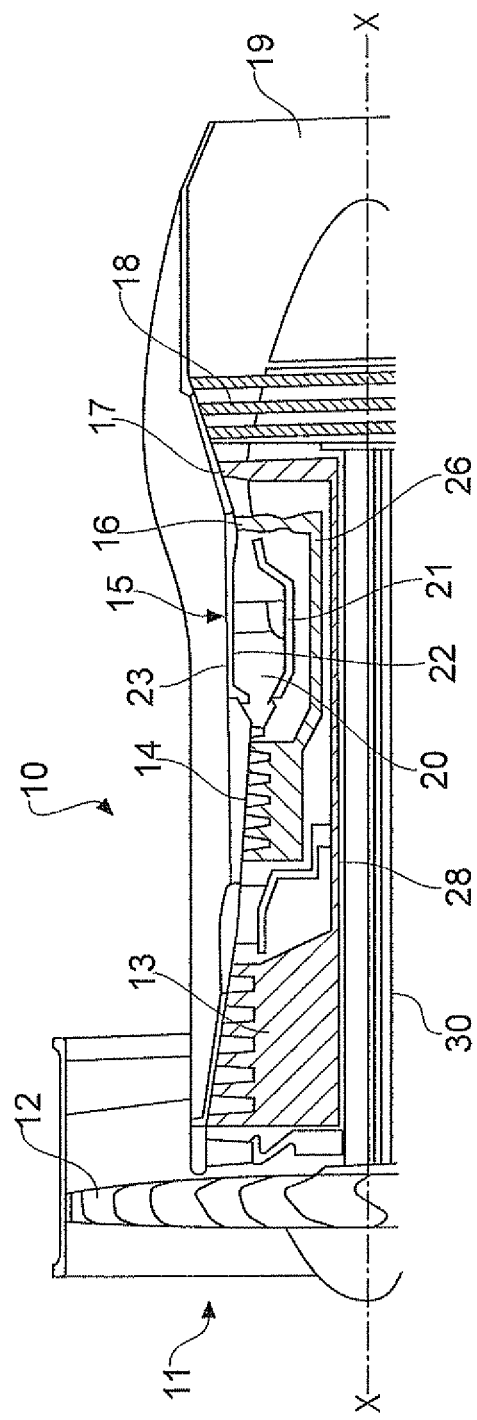
FIG. 1 is a schematic part side cross section of a prior art gas turbine engine.
Figure 2A:
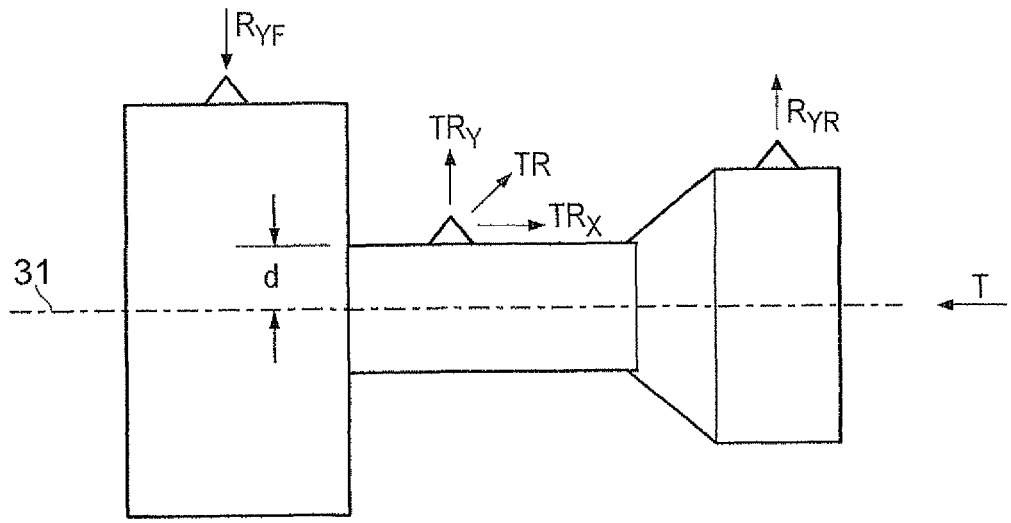
FIG. 2A is a schematic illustration of the forces acting on a gas turbine engine in operation.
Figure 2B:
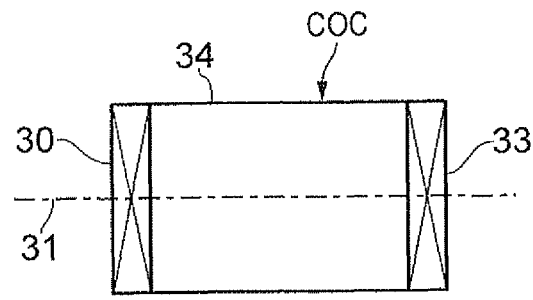
FIG. 2B is a schematic illustration of the distortion caused to a COC as a result of the forces illustrated in FIG. 2A.
Figure 2B:
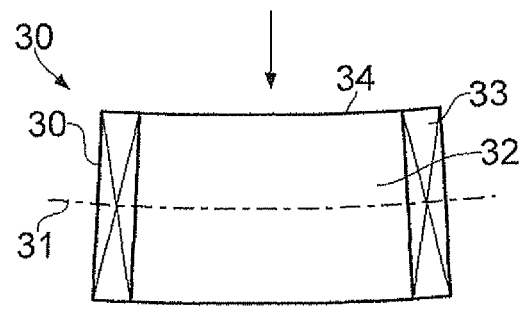
Figure 2C:
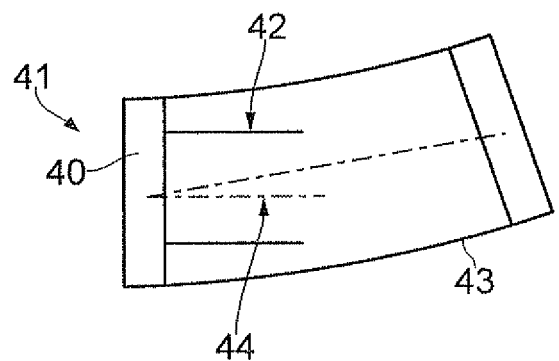
FIGS. 2C, 2D and 2E illustrate three prior art means of mounting HPC casings within combustion casings.
Figure 2D:
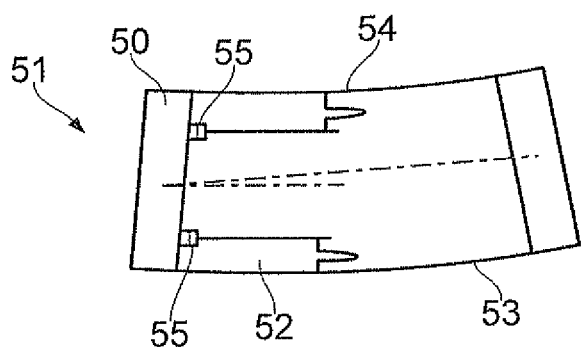
Figure 2E:
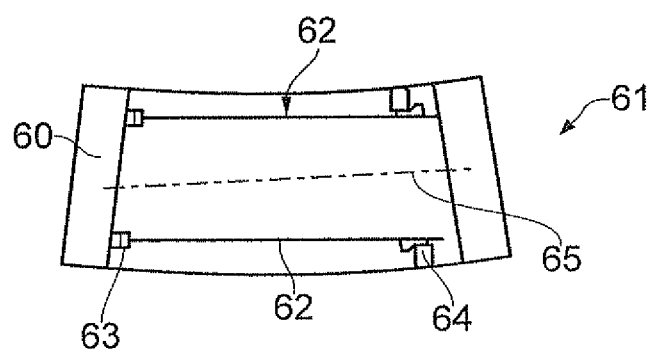

As indicated above, provision of a relatively small diameter combustion outer casing (COC) has benefits in terms of lower weight but can cause difficulties when trying to accommodate structure to avoid high pressure compressor casing distortion. Aspects of the present invention attempt to provide the benefits of a relatively small diameter combustion outer casing (COC) with the benefits of asymmetric load isolation and high pressure compressor casing and rotor concentricity, more typically achieved with a double skin casing concept as depicted in FIG. 2E above.

Aspects of the present invention provide driver arms which link the high pressure compressor casing to a rear bearing structure typically through a casing association to a stable bearing support. Each driver arm is connected to the high pressure compressor inner or first casing through a non-rotating link. This link extends radially and typically takes the form of an upstanding bolt or other element. Generally, a slide association is provided between the casing and other parts to accommodate for distortion. This sliding mounting is typically achieved through splines to facilitate casing dilation if necessary. At the other end of the driving arm is a further rotating association with typically an outer or second casing coupled to a bearing support arrangement. In such circumstances, the general configuration of the driver arms is to act as stiffeners between the first or inner casing provided by the high pressure compressor casing and the second or outer casing typically provided by the turbine casing. The first casing and the second casing are substantially consistent about a common axis.

The radially extending link passes through a clearance hole or aperture in the second casing. The radially extending link is located within the aperture with a sufficient degree of clearance to avoid interference in use as a result of casing distortions. It will be understood that the provision of the radially extending link provides a situation where there is no hard connection made between the first or inner casing (HPC casing) and the second or outer casing (COC). In order to provide particular benefits with regard to aspects of the present invention, typically the links will be located at 3 o'clock and 9 o'clock positions relative to a plane perpendicular to the common axis of the engine arrangement. Such positioning will minimize bending effects on the first casing shape as the support structures bend towards each other under operational loads such as engine thrust loads as described above with regard to FIG. 2A.

Figure 3:
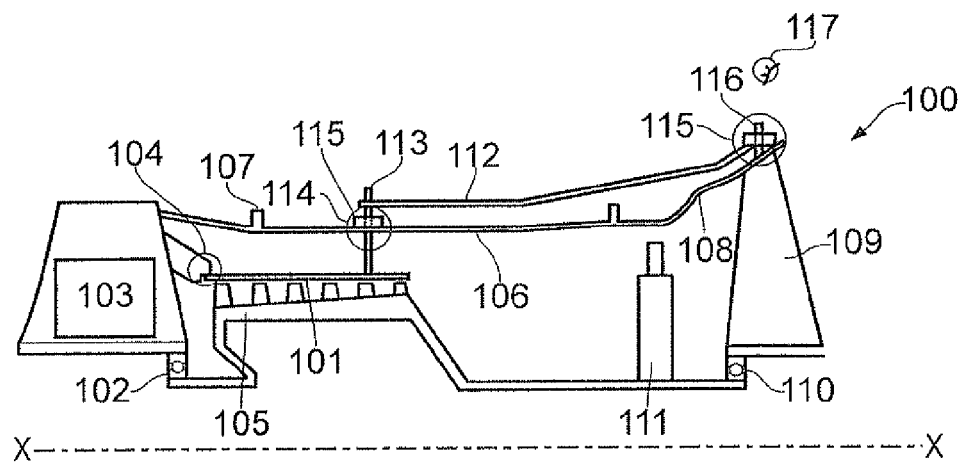
FIG. 3 is a schematic part side cross section of a casing arrangement in accordance with aspects of the present invention.

FIG. 3 provides a schematic cross section viewed from the top of an engine 100 in accordance with aspects of the present invention. The embodiment depicted is of a gas turbine engine but aspects of the present invention could be utilized with other machines in which there is asymmetric loading of casings about a rotating component assembly. Thus, the engine arrangement 100 comprises a high pressure compressor (inner) casing 101 Presented upon a front bearing support structure 102 which is relatively stiff. The front end of the casing 101 is generally in a sliding association 104 with front bearing support structure 102. Within the casing 101 a high pressure compressor rotor assembly 105 is provided. The assembly 105 rotates about a centre line or common axis X-X. The front bearing support structure 102 is also associated with a second or combustion outer casing 106 through an appropriate flange 107. The second casing or combustion outer casing 106 extends rearwardly to a turbine casing 108. The casing 108 is presented upon a rear or turbine bearing support structure 109. The structure 109 is relatively rigid and stable in accordance with aspects of the present invention.

Within the turbine casing 108 there is provided a high pressure turbine rotor assembly 111 which rotates about the axis of X-X. In such circumstances, it will be appreciated that the casings 106, 108 are substantially concentric about the common centre line or axis X-X. As indicated above, as a result of thrust or other actions within the arrangement 100, there will be asymmetric loading upon the casings 101, 108. The asymmetric loading results in potential distortions which may result in particularly in contact and rub between the high pressure compressor rotors 105 and the casing 101. In order to reduce such distortions as illustrated in FIG. 3 a driver arm 112 is provided. The driver arm 112 extends from a radially extending link 113 at one end to association with the second casing and therefore second bearing support 109, 110 at the other end. The view shown in FIG. 3 is substantially a view from above the arrangement 100 and therefore it will be appreciated that the radially extending links 113 are substantially positioned preferably at 3 o'clock and 9 o'clock in a plane perpendicular to the axis X-X. As will be described later the driver arm 112 acts to remove distortion, particularly in the casing 101 to maintain concentricity and therefore avoid rub between the rotors 105 and the casing 101.

The radially extending link 113, as indicated above, is non-rotating upon the casing 101. The radially extending link 113 extends through the casing 106 through an aperture 114. As indicated above, there will be distortions of the casing 106 and therefore generally adequate clearance is provided to avoid clash between the radially extending link 113 and the aperture 114. Nevertheless, particularly in circumstances as described in the particular embodiment, the casing 106 will be the combustion outer casing and therefore containment of combustion gases may be required. In such circumstances an appropriate air or other seal element 115 will be provided. The air seal 115 will prevent substantial gas escaping through the aperture 114.

As indicated above, the front of the casing 101 is typically located within a slide association joint 104 appropriate to provide radial support to the front of the casing 101. Such a sliding association 104 is required to accommodate relative axial movement between the casing 101 and the front bearing support structure 102.

At the other end the driver arm 112 is secured through a rotating link to a shaft or pin 116 secured to the outside of the second casing 106/108. The association as indicated allows some rotation in the direction of arrow heads 17 about the pin 116 but through an appropriate mounting 118, secure presentation of the driver arm 112 axially.

By the above configuration of the engine arrangement 100, it will be appreciated that the casing 101 is mounted in a similar manner to the high pressure compressor rotors 105 in that the ends of the mountings are associated with the relatively stiff structure achieved by the front or first bearing support 102 and the rear or second bearing support 110. In such circumstances, should the engine arrangement 100 bend as shown in FIG. 2A above, then the rear bearing support 110 will be pulled upward and bend towards the front bearing support 102. In such circumstances the driver arm 112 will be moved upwards relative to the front bearing structure 102 and so maintain concentricity of the casing 101, with the high pressure compressor rotor 105 mounted upon the first bearing support structure 102. The sliding association 104 will accommodate for relative axial movement as the front bearing support 102 and the rear bearing support 110 bend towards each other.

Figure 4:
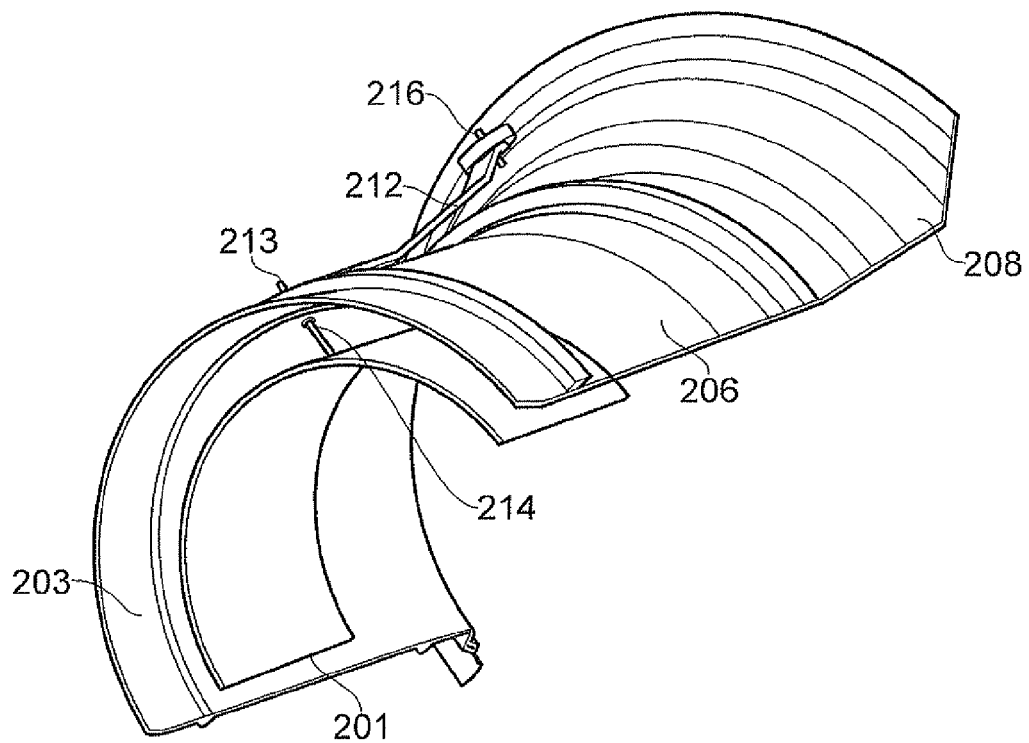
FIG. 4 is a pictorial front perspective view of a casing arrangement in accordance with further aspects of the present invention.
Figure 5:
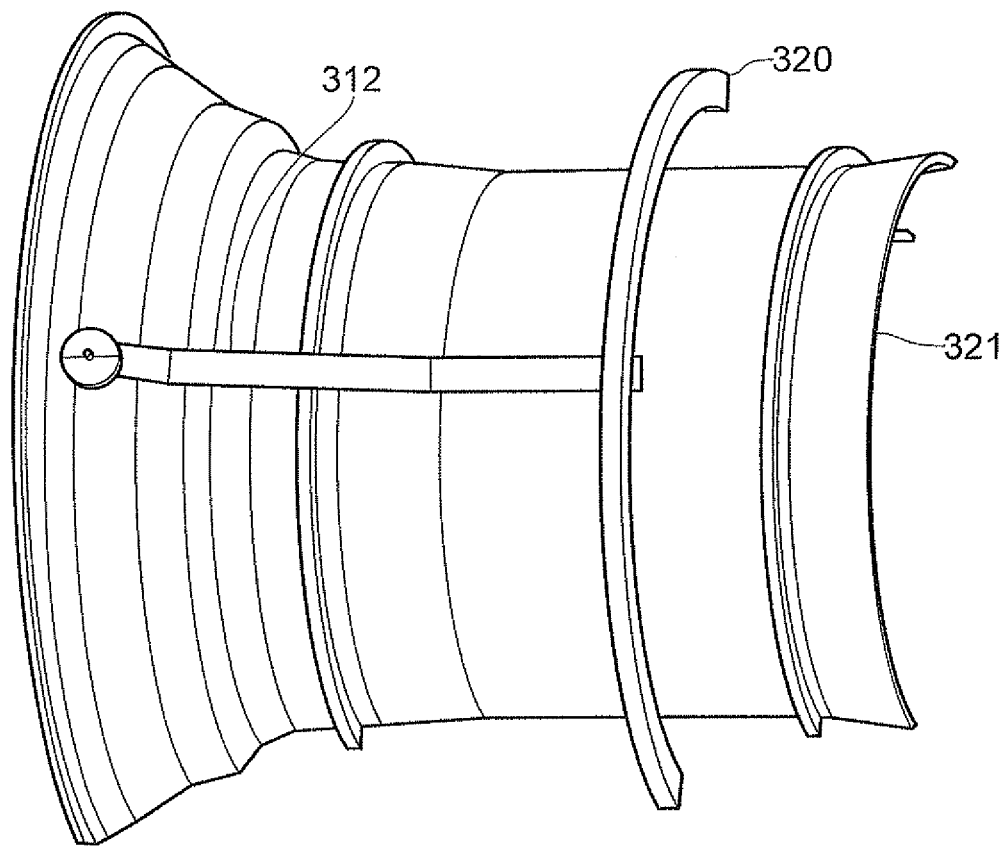
FIG. 5 is a side perspective view of a casing arrangement in accordance with additional aspects of the present invention.

FIG. 4 provides a more pictorial representation of a front perspective part of an engine arrangement 200 in accordance with aspects of the present invention. An inter-casing 203 acts as a containment about a first or high pressure compressor inner casing 201 with a radially extending link 213 passing through an aperture 214 with an appropriate seal (not shown). The radially extending link 213 is associated with a driver arm 212. The driver arm 212 is also associated with a mounting 216. Thus, as can be appreciated for the reasons as described above, maintenance of concentricity of the casing 201 about a rotating assembly (not shown) can be achieved through the driver arm 112 raising the casing 201 through the non-rotating connection at the front of the driver arm and the rotating connection at the rear of the driver arm and resulting in concentricity between the casing and the rotor being maintained independently of the shape taken by the outer casing 206. As indicated previously, typically the second casing will also be part of a containment casing or in the specific embodiment depicted a combustion outer casing (COC) 206. In such circumstances as indicated above, a seal 240 will act as an air seal to prevent too great a loss of gases.

The high pressure compressor will pass flow through a stage of outlet guide vanes prior to entry into the combustor. These outlet guide vanes (OGV) will extend between the inter-casing 203 and the inner casing 201. The outlet guide vanes (not shown) can carry significant loading and are typically bolted to a flange on the second or combustion outside casing (COC).

The OGV structure can also be bolted to the inner casing and the rearward load (from the turbine nozzle guide vanes) employed to counteract the forward thrust load from the HP compressor operation. This will reduce the nett thrust to be reacted at the front of the inner casing onto the front bearing support structure.

In accordance with aspects of the present invention, thrust would be reacted at the front of the inner casing 201 onto the front bearing support structure. In accordance with aspects of the present invention, it is envisaged that the high pressure compressor torque would react at the front of the high pressure compressor casing or first casing, Side loading could be reacted by employing some form of thrust reaction inside the COC at the radial link exit—possibly thrust plate reaction against a spring could be employed integral to the air sealing system. Dogs could be provided at 12 and 6 o'clock on the inside of the COC against which similar features on the rear of the inner casing 102 would react under severe side loads which would be greater than that capable of being reacted by the thrust plate system described previously. This would prevent 'fishtailing' of the casing rear which would result in local heavy running of the casing with the HPC blade tips. One or more bracing rings could be added to the driver arm system which would resist movement of the driver arms in the horizontal place through torsional rigidity thus adding stiffness to the system.

A further advantage with regard to aspects of the present invention is that the driver arm and appropriate linkages in associations with the casings are presented in generally cooler zones outside of the combustion outer casing in a gas turbine engine. In such circumstances, it is possible to employ generally lighter weight materials such as titanium for such driver arms dependent upon an appropriate temperature survey. Also, within a cooler environment there is less likelihood of thermal effects causing any binding or seizing of the mechanism provided by the driver arm such as may occur if mounted closer within the compressor or turbine environment.

By aspects of the present invention, typically a lighter, cheaper and more effective casing mounting arrangement is provided. Furthermore this casing mounting arrangement will be less prone to asymmetric loading induced into surrounding support structures. In such circumstances there is more predictability and control with reduced rub between the rotating components. With regard to a gas turbine engine there will be significant fuel consumption reductions along with an extended operational life for the engine. Furthermore, such desirable objectives may be achieved through simple passive structural configurations avoiding complicated feedback control and actuation systems in order to provide results. In such circumstances the arrangement is generally simpler and more reliable than an active feedback control arrangement.

Aspects of the present invention can be utilized in maintaining maintenance of concentricity between a rotating component and a surrounding enclosure in a number of machines and applications. As indicated, particular applicability is associated with gas turbine engines but it will also be appreciated that pumps and fans may also require maintenance of concentricity.

Modifications and alterations to aspects of the present invention will be appreciated by those skilled in the technology. Thus, for example, as indicated two or more driver arm associations would be advantageous. Furthermore, these driver arrangements will typically be formed from and have the same configuration in terms of component size and length of driver arm. Alternatively, different sizes and configurations of driver arm and associations may be appropriate in order to reflect the predicted asymmetric loading upon the arrangement in use.

The invention claimed is:

1. A casing arrangement for a gas turbine engine, the arrangement comprising an inner casing presented upon a first bearing support and an outer casing presented upon a second bearing support concentric about a common centre line or axis, the inner casing having a radially extending link, a driver arm extending from the radially extending link, the driver arm associated with the second bearing support through the outer casing to provide a reaction path to bending of the second bearing support relative to the first bearing support, the reaction path extending at least partially in the direction of the common centre line.

2. An arrangement as claimed in claim 1 wherein the inner casing comprises a high pressure compressor casing within a gas turbine engine.

3. An arrangement as claimed in claim 1 wherein the outer casing comprises a combustion outer casing (COC) of a gas turbine engine.

4. An arrangement as claimed in claim 1 wherein there are at least two radially extending links.

5. An arrangement as claimed in claim 4 wherein the two radially extending links are presented respectively at substantially 3 o'clock and 9 o'clock in a plane extending perpendicularly to the common axis.

6. An arrangement as claimed in claim 1 wherein the inner casing has a slide mounting.

7. An arrangement as claimed in claim 6 wherein the slide mounting is provided by inter-engaging splines associated with part of the inner casing.

8. An arrangement as claimed in claim 1 wherein the association between the radially extending link and the driver arm is non-rotating.

9. An arrangement as claimed in claim 1 wherein the driver arm is associated with the outer casing by rotating mounting.

10. An arrangement as claimed in claim 1 wherein the inner casing is surrounded by a containment casing.

11. An arrangement as claimed in claim 10 wherein the containment casing is the outer casing.

12. An arrangement as claimed in claim 10 wherein the radially extending links extend through an aperture in the containment casing without contacting the casing.

13. An arrangement as claimed in claim 12 wherein the aperture has a sealed element.

14. An arrangement as claimed in claim 1 where a bracing ring is provided at a junction of the driver arm and the radially extending link and possibly extra rings provided axially rearward of this bracing ring.

15. An arrangement as claimed in claim 1 wherein a spring loaded thrust plate is provided at a junction of the driver arm and the radially extending link.

16. An arrangement as claimed in claim 1 wherein the inner casing and the outer casing respectively present dog elements between them, the dog elements arranged to react against each other upon bending of the arrangement about the common axis in the horizontal plane.

17. A gas turbine engine incorporating a casing arrangement as claimed in claim 1.

* * * * *